(12) United States Patent
Peng (10) Patent No.: US 11,287,053 B1
(45) Date of Patent: Mar. 29, 2022

(54) PRESSING-CONTROLLED MIXING VALVE CORE WITH THROUGH FLOW CONTROL TYPE ON THE TOP

(71) Applicant: KUCHING INTERNATIONAL LTD., Taichung (TW)

(72) Inventor: Hao-Nan Peng, Taichung (TW)

(*) Notice: Subject to any disclaimer, the term of this patent is extended or adjusted under 35 U.S.C. 154(b) by 15 days.

(21) Appl. No.: 17/029,267

(22) Filed: Sep. 23, 2020

(51) Int. Cl.
*F16K 31/52* (2006.01)
*F16K 11/078* (2006.01)

(52) U.S. Cl.
CPC .......... *F16K 31/523* (2013.01); *F16K 11/078* (2013.01)

(58) Field of Classification Search
CPC .............................. F16K 11/078; F16K 31/523
See application file for complete search history.

(56) References Cited

U.S. PATENT DOCUMENTS

| | | | | |
|---|---|---|---|---|
| 3,220,695 A * | 11/1965 | Jones | ................... | E03C 1/2306 251/263 |
| 3,282,295 A * | 11/1966 | Skriletz | ................ | F16K 11/078 137/625.17 |
| 4,936,347 A * | 6/1990 | Oracz | ................... | F16K 11/078 137/625.17 |
| 6,276,659 B1 * | 8/2001 | Wang | ...................... | F16K 21/10 251/230 |
| 9,091,357 B2 * | 7/2015 | Chen | ................... | F16K 11/0782 |
| 9,228,675 B2 * | 1/2016 | Chen | ................... | F16K 27/044 |
| 9,464,417 B2 * | 10/2016 | Chen | ................... | F16K 11/0787 |
| 10,487,952 B2 * | 11/2019 | Chen | ................... | F16K 11/074 |
| 10,487,953 B2 * | 11/2019 | Chen | ................... | F16K 11/0743 |
| 10,533,651 B2 * | 1/2020 | Suzumura | ............. | F16H 57/022 |
| 10,563,781 B2 * | 2/2020 | Chen | ....................... | F16K 35/04 |
| 11,067,198 B1 * | 7/2021 | Peng | ................. | F16K 31/52483 |

* cited by examiner

*Primary Examiner* — Kevin R Barss
(74) *Attorney, Agent, or Firm* — Egbert, McDaniel & Swartz, PLLC (57) ABSTRACT

Disclosed is a pressing-controlled mixing valve core with through flow control type on the top, having a shell body, a rotational inner shell, a water guide base, fixed and moving ceramic chips, a flow adjustment top seat and a pressing-controlled lifting actuator. By changing the rotation angle of the moving ceramic chip, its mixed water adjustment hole has different communication states to the guide holes of the fixed ceramic chip, so as to adjust the mixture state of the inlet water flow. Through a pressing action by the user, the water control rod head on the lifting shaft of the actuator will have rising and descending positions inside the vertical through hole and through flow passage of the flow adjustment top seat, so as to change the sectional area of the water flow in the through flow passage and adjust the output water flow of the pressing-controlled mixing valve core.

6 Claims, 7 Drawing Sheets

PRESSING-CONTROLLED MIXING VALVE CORE WITH THROUGH FLOW CONTROL TYPE ON THE TOP

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a pressing-controlled valve core, and more particularly to an innovative pressing-controlled mixing valve core with through flow control type on the top.

2. Description of Related Art Including Information Disclosed Under 37 CFR 1.97 and 37 CFR 1.98

The pressing-controlled valve core referred to in the present invention means a valve core with a pressing-controlled linkage device to control the output flow rate.

A pressing-controlled linkage device provided in a conventional pressing-controlled valve core is usually applied for flow adjustment or open-close control of single water source. The water flow is controlled mainly through the lifting shaft going up or down within the vertical hole formed inside the ceramic valve block, when driven by the pressing-controlled lifting actuator.

However, in practice, the above-mentioned conventional structure is often complained for the problem of flow loss derived from the configuration of the vertical hole. When further applying this type of pressing-controlled structure in water tap products to control water of two different temperatures or qualities, the sectional area of the flow passage must be larger to hold the mixed water from two water inlets, the ceramic valve block will have to be thicker, and the flow passages becomes more complex. This will lead to more manufacturing difficulties, higher production cost, and high defective rate of finished products.

BRIEF SUMMARY OF THE INVENTION

The main objective of the present invention is to provide a pressing-controlled mixing valve core with through flow control type on the top. It aims to find a technical solution to develop an innovative and ideally practical pressing-controlled valve core having two functions: adjustment of the mixture of two water sources and fast pressing-controlled flow rate shifting.

In the present invention is a pressing-controlled mixing valve core with through flow control type on the top, said pressing-controlled mixing valve core comprising:

a shell body, having a cylindrical peripheral wall, formed on a reduced pipe mouth on the top end of the cylindrical peripheral wall, and a lower opening formed on the bottom end of the cylindrical peripheral wall, the inside of the shell body defining a chamber;

a rotational inner shell, housed inside the chamber of the shell body, capable of rotation under force, said rotational inner shell including a rotational seat configured at a higher position on the top section of the chamber, a reduced passive tube portion connected above the rotational seat, and a plurality of driving claws, protruding out of the lower end of the rotational seat and arranged at intervals, wherein the top end of said reduced passive tube portion goes upward through the reduced pipe mouth of the shell body, the lower end of said reduced passive tube portion is formed with a bottom wall, and said bottom wall is formed with an axial through hole;

a water guide base, locked and positioned on the lower opening of the shell body through a plurality of lockers, configured with a mixed water outlet, a first water source inlet, and a second water source inlet, respectively at the central position and eccentric positions, spaced between each other;

a fixed ceramic chip, stacked and positioned above the water guide base, and placed inside the chamber of the shell body, configured with a mixed water guide hole, a first guide hole and a second guide hole, respectively at the central position and eccentric positions, spaced between each other, respectively aligned to and normally communicated to the mixed water outlet, first water source inlet, and second water source inlet configured on the water guide base;

a moving ceramic chip, stacked above the fixed ceramic chip and placed inside the chamber of the shell body, capable of rotation, configured with a mixed water extraction hole, and a mixed water adjustment hole, positioned respectively at the central position and eccentric position, spaced between each other, wherein, said mixed water extraction hole is normally communicated to the mixed water guide hole of the fixed ceramic chip, while the mixed water adjustment hole goes along the rotation of the moving ceramic chip to have different communication state to the first guide hole and to the second guide hole of the fixed ceramic chip, so as to adjust the mixture of the inlet water flow; the lateral side of said moving ceramic chip is formed with a plurality of passive concave margins spaced between each other, to be inserted by the plurality of driving claws of the rotational inner shell, so that the moving ceramic chip will rotate simultaneously with the rotational inner shell;

a flow adjustment top seat, stacked above the moving ceramic chip and placed inside the chamber of the shell body, said flow adjustment top seat rotating simultaneously with the moving ceramic chip, the bottom of said flow adjustment top seat formed with a through flow passage recessing upward, said through flow passage communicated both to the mixed water extraction hole and to the mixed water adjustment hole configured on the moving ceramic chip; said through flow passage is formed with a vertical through hole at the position corresponding to the center of the flow adjustment top seat, the top end of said vertical through hole aligned to the axial through hole formed on the bottom wall of the reduced passive tube portion of the rotational inner shell; and a pressing-controlled lifting actuator, mainly housed inside the reduced passive tube portion of the rotational inner shell, said pressing-controlled lifting actuator comprising a shell, a pressing piece, a lifting actuator, a lifting shaft, and an elastic recovering component, wherein, said pressing piece is configured on the top end of the shell, capable of moving under pressure, said lifting shaft includes a passive shaft and a water control rod head connected to the lower end of the passive shaft, the upper end of said passive shaft is extended into the shell, while said water control rod head protrudes downward out of the lower end of the shell, said lifting actuator is housed inside the shell and fitted between the pressing piece and the lifting shaft, said lifting actuator is used to transform the pressing action of the pressing piece into a lifting action of the lifting shaft, said elastic recovering component is configured inside the shell to enable automatic recovery of the lifting shaft; furthermore, the lower end of said passive shaft goes through the axial through hole formed on the bottom wall of the reduced passive tube portion of the rotational inner shell, so that the water control rod head is positioned inside the vertical through hole and the through flow passage formed on the flow adjustment top seat, and the water control rod head has a rising position and a descending position along the up-and-down movement of the lifting shaft to change the sectional area of water flow from the through flow passage and adjust the outlet water flow of the pressing-controlled mixing valve core.

Based on the innovative structural composition with its technical features, the present invention provides an inventive valve core structure with dual functions: adjustment of the mixture of two water sources and fast pressing-controlled flow rate shifting. Thanks to its simple structural composition, it is very suitable for mass production. While maintaining satisfactory flow rate, it features easy operation.

DETAILED DESCRIPTION OF THE INVENTION

Depicted in FIG. 1 to FIG. 5 is a preferred embodiment of the present invention of a pressing-controlled mixing valve core with through flow control type on the top. However, such an embodiment is for illustrative purpose only, and is not intending to limit the scope of the invention.

The pressing-controlled mixing valve core 100 comprises the following components: a shell body 10, having a cylindrical peripheral wall 11, formed on a reduced pipe mouth 12 on the top end of the cylindrical peripheral wall 11, and a lower opening 13 formed on the bottom end of the cylindrical peripheral wall 11, the inside of the shell body 10 defining a chamber 14.

A rotational inner shell 20 is housed inside the chamber 14 of the shell body 10, and is capable of rotation under force. Said rotational inner shell 20 including a rotational seat 21 configured at a higher position on the top section of the chamber 14, a reduced passive tube portion 22 connected above the rotational seat 21, and a plurality of driving claws 23, protruding out of the lower end of the rotational seat 21 and arranged at intervals. The top end of said reduced passive tube portion 22 goes upward through the reduced pipe mouth 12 of the shell body 10, the lower end of said reduced passive tube portion 22 is formed with a bottom wall 24, and said bottom wall 24 is formed with an axial through hole 25.

A water guide base 30 is locked and positioned on the lower opening 13 of the shell body 10 through a plurality of lockers 31, configured with a mixed water outlet 32, a first water source inlet 33, and a second water source inlet 34, respectively at the central position and eccentric positions, spaced between each other.

A fixed ceramic chip 40 is stacked and positioned above the water guide base 30 and placed inside the chamber 14 of the shell body 10. Said fixed ceramic chip 40 is configured with a mixed water guide hole 42, a first guide hole 43 and a second guide hole 44, respectively at the central position and eccentric positions, spaced between each other, respectively aligned to and normally communicated to the mixed water outlet 32, first water source inlet 33, and second water source inlet 34 configured on the water guide base 30.

A moving ceramic chip 50 is stacked above the fixed ceramic chip 40 and placed inside the chamber 14 of the shell body 10, capable of rotation, configured with a mixed water extraction hole 51 and a mixed water adjustment hole 52, positioned respectively at the central position and an eccentric position, spaced between each other. Said mixed water extraction hole 51 is normally communicated to the mixed water guide hole 42 of the fixed ceramic chip 40, while the mixed water adjustment hole 52 goes along the rotation of the moving ceramic chip 50 to have different communication state to the first guide hole 43 and to the second guide hole 44 of the fixed ceramic chip 40, so as to adjust the mixture of the inlet water flow (such as water temperature or water quality). Furthermore, the lateral side of said moving ceramic chip 50 is formed with a plurality of passive concave margins 53 spaced between each other, to be inserted by the plurality of driving claws 23 of the rotational inner shell 20, so that the moving ceramic chip 50 will rotate simultaneously with the rotational inner shell 20.

A flow adjustment top seat 60 is stacked above the moving ceramic chip 50 and placed inside the chamber 14 of the shell body 10. Said flow adjustment top seat 60 rotating simultaneously with the moving ceramic chip 50, the bottom of said flow adjustment top seat 60 formed with a through flow passage 61 recessing upward, said through flow passage 61 communicated both to the mixed water extraction hole 51 and to the mixed water adjustment hole 52 configured on the moving ceramic chip 50. Moreover, said through flow passage 61 is formed with a vertical through hole 62 at the position corresponding to the center of the flow adjustment top seat 60, the top end of said vertical through hole 62 aligned to the axial through hole 25 formed on the bottom wall 24 of the reduced passive tube portion 22 of the rotational inner shell 20.

A pressing-controlled lifting actuator 70 is mainly housed inside the reduced passive tube portion 22 of the rotational inner shell 20. Said pressing-controlled lifting actuator 70 comprises a shell 71, a pressing piece 72, a lifting actuator 73, a lifting shaft 74, and an elastic recovering component 75, wherein, said pressing piece 72 is configured on the top end of the shell 71, capable of moving under pressure. Said lifting shaft 74 includes a passive shaft 741 and a water control rod head 743 connected to the lower end of the passive shaft 741. The upper end of said passive shaft 741 is extended into the shell 71, while said water control rod head 743 protrudes downward out of the lower end of the shell 71. Said lifting actuator 73 is housed inside the shell 71 and fitted between the pressing piece 72 and the lifting shaft 74. Said lifting actuator 73 is used to transform the pressing action of the pressing piece 72 into a lifting action of the lifting shaft 74. Said elastic recovering component 75 is configured inside the shell 71 to enable automatic recovery of the lifting action of the lifting shaft 74. Furthermore, the lower end of said passive shaft 741 goes through the axial through hole 25 formed on the bottom wall 24 of the reduced passive tube portion 22 of the rotational inner shell 20, so that the water control rod head 743 is positioned inside the vertical through hole 62 and the through flow passage 61 formed on the flow adjustment top seat 60, and the water control rod head 743 has a rising position and a descending position along the up-and-down movement of the lifting shaft 74 to change the sectional area of water flow from the through flow passage 61 and adjust the outlet water flow of the pressing-controlled mixing valve core 100.

Figure 5:
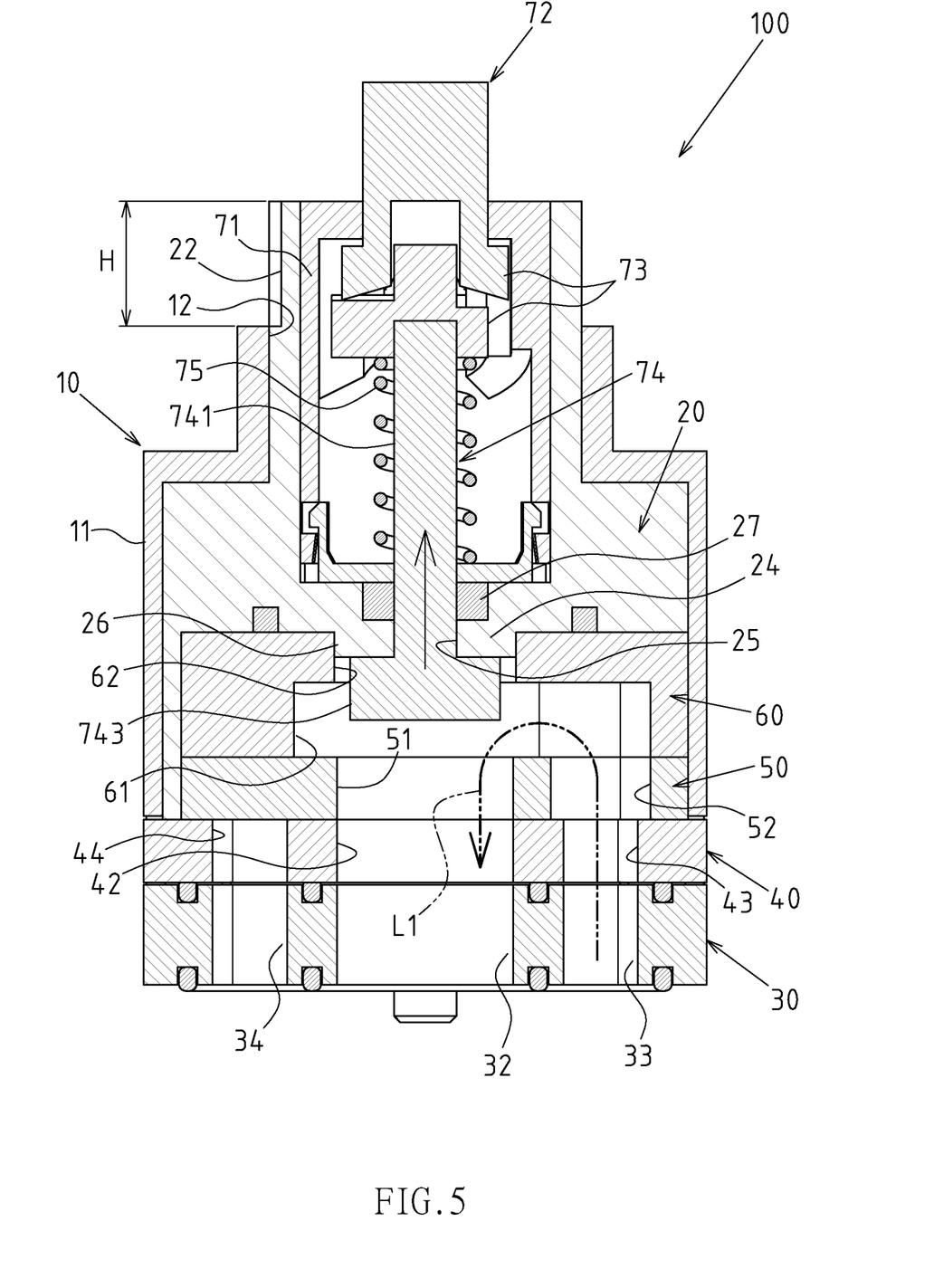
FIG. 5 is a combined vertical sectional view of the pressing-controlled mixing valve core when the lifting shaft is at a rising position.

Referring to FIG. 5, in the present embodiment, the bottom wall 24 of the reduced passive tube portion 22 of the rotational inner shell 20 further protrudes downward to form a convex wall portion 26. Said convex wall portion 26 is aligned to and inserted into the vertical through hole 62 of the flow adjustment top seat 60 for a certain depth. The structural form disclosed in the present embodiment can further strengthen the stability of the combined state of the rotational inner shell 20. During rotation, it is more stable thanks to the convex wall portion 26 working as the rotational support point.

Figure 6:
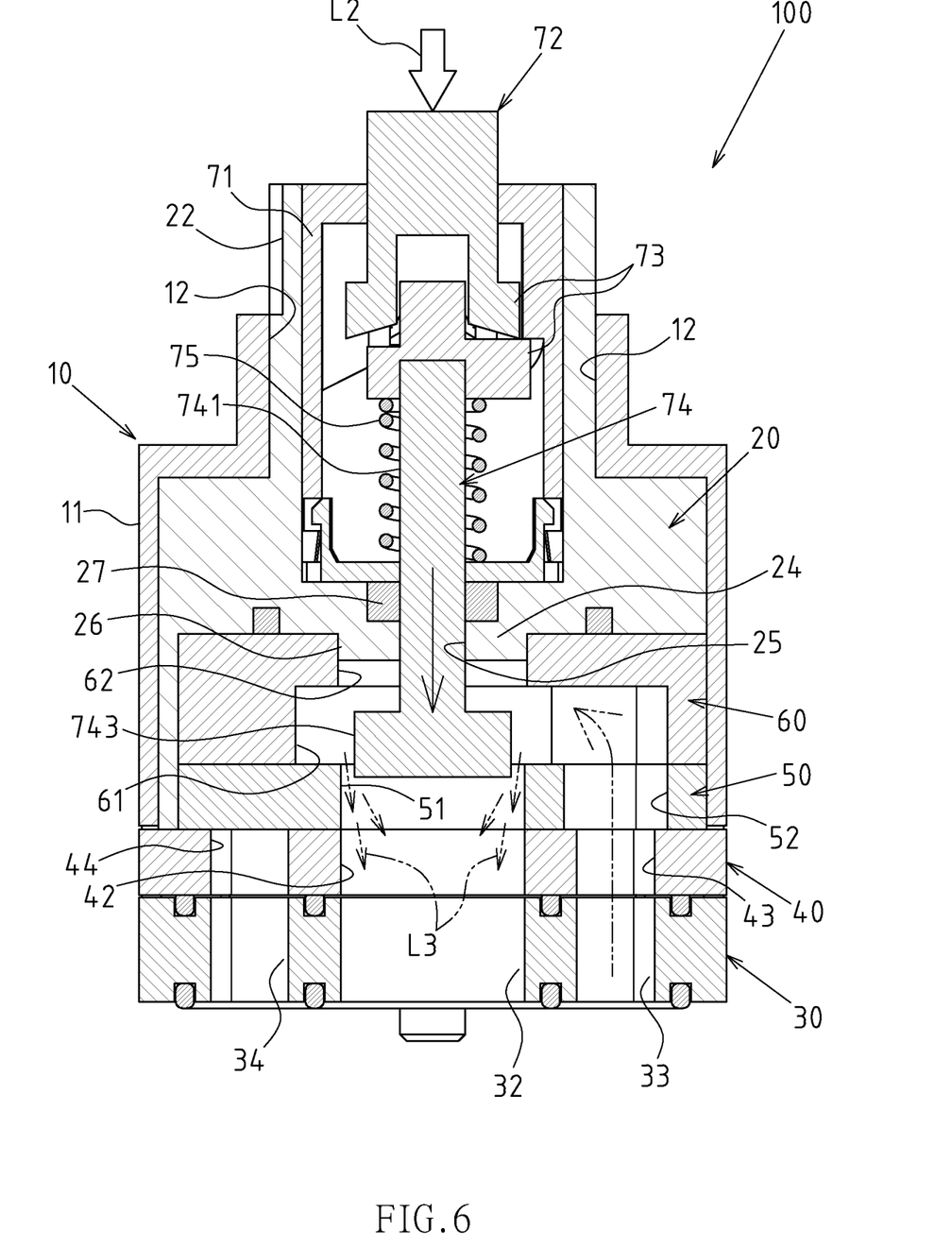
FIG. 6 is a combined vertical sectional view of the pressing-controlled mixing valve core when the lifting shaft is at a descending position.

Referring to FIG. 6, in the present embodiment, when the water control rod head 743 is at a descending position, it is lowered into the mixed water extraction hole 51 of the moving ceramic chip 50 for a certain depth, so that there remains only a ring-shaped flow passage between the water control rod head 743 and the mixed water extraction hole 51, realizing the state of relatively low flow rate.

Referring to FIG. 5, in the present embodiment, the bottom wall 24 of the reduced passive tube portion 22 of the rotational inner shell 20 is further configured with a sealing ring 27, said sealing ring 27 being sealed against the passive shaft 741 of the lifting shaft 74. The function of the sealing ring 27 disclosed in the present embodiment is to prevent the water inside the through flow passage 61 from leaking upward along the lifting shaft 74.

Figure 2:
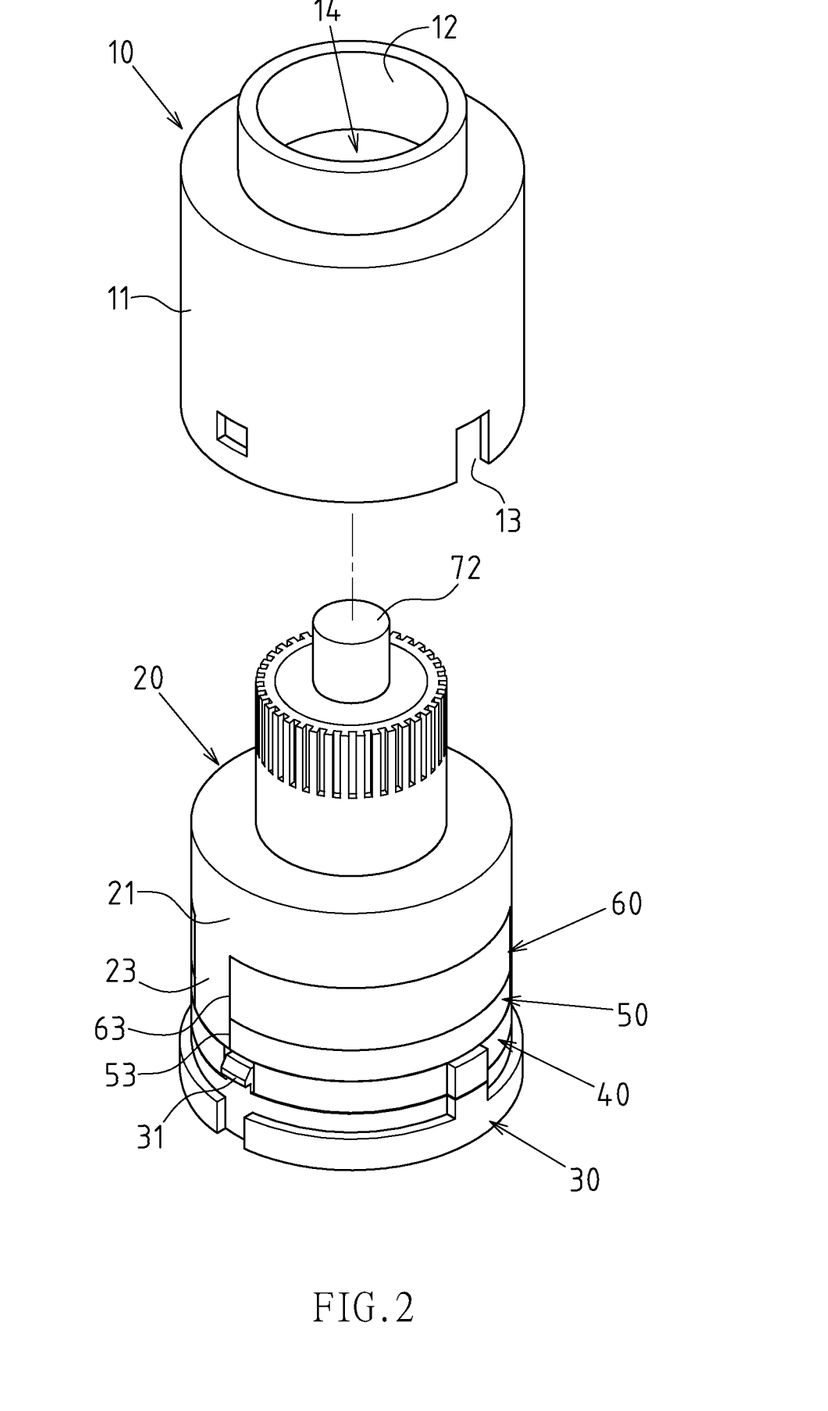
FIG. 2 is an exploded perspective view 1 of a pressing-controlled mixing valve core of the present invention, only exploding the shell body.
Figure 3:
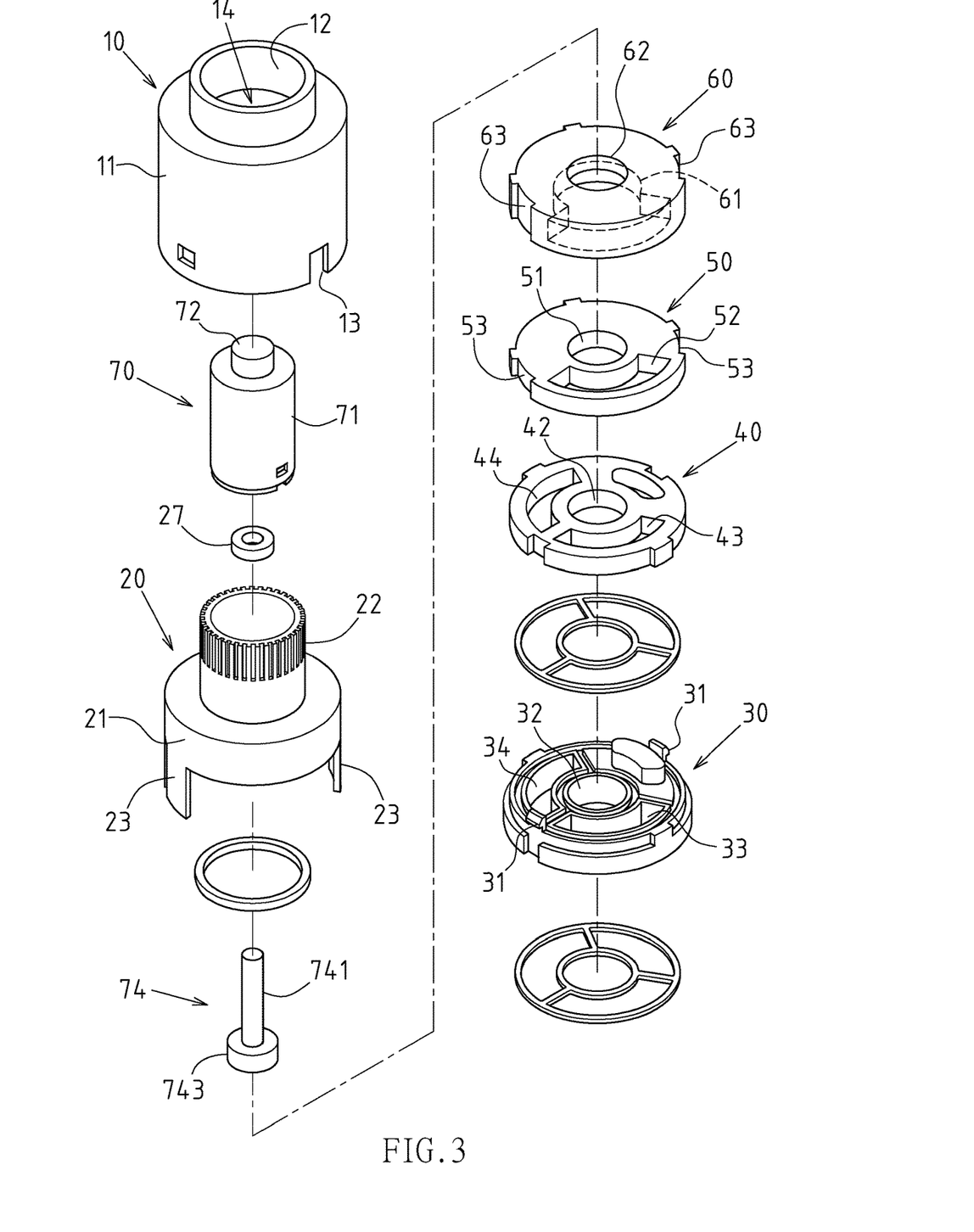
FIG. 3 is an exploded perspective view 2 of a pressing-controlled mixing valve core of the present invention, showing detailed components.
Figure 4:
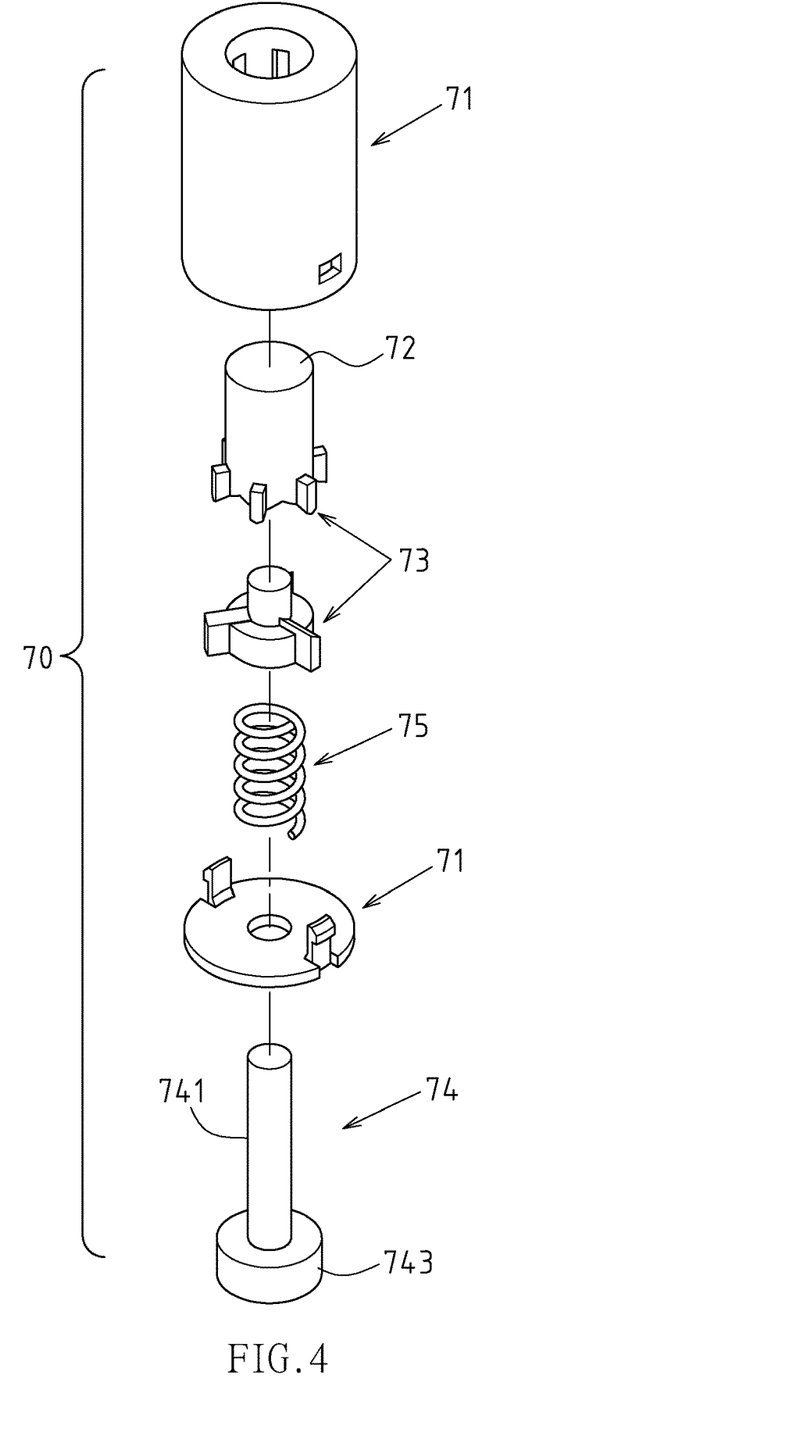
FIG. 4 is an exploded perspective view of the pressing-controlled lifting actuator of the present invention.

Referring to FIG. 2 and FIG. 3, in the present embodiment, the lateral side of the flow adjustment top seat 60 is formed with a plurality of passive grooves 63 with a space between each other, to be inserted by the plurality of driving claws 23 of the rotational inner shell 20, so that the flow adjustment top seat 60, the moving ceramic chip 50 and the rotational inner shell 20 rotate simultaneously.

Figure 1:
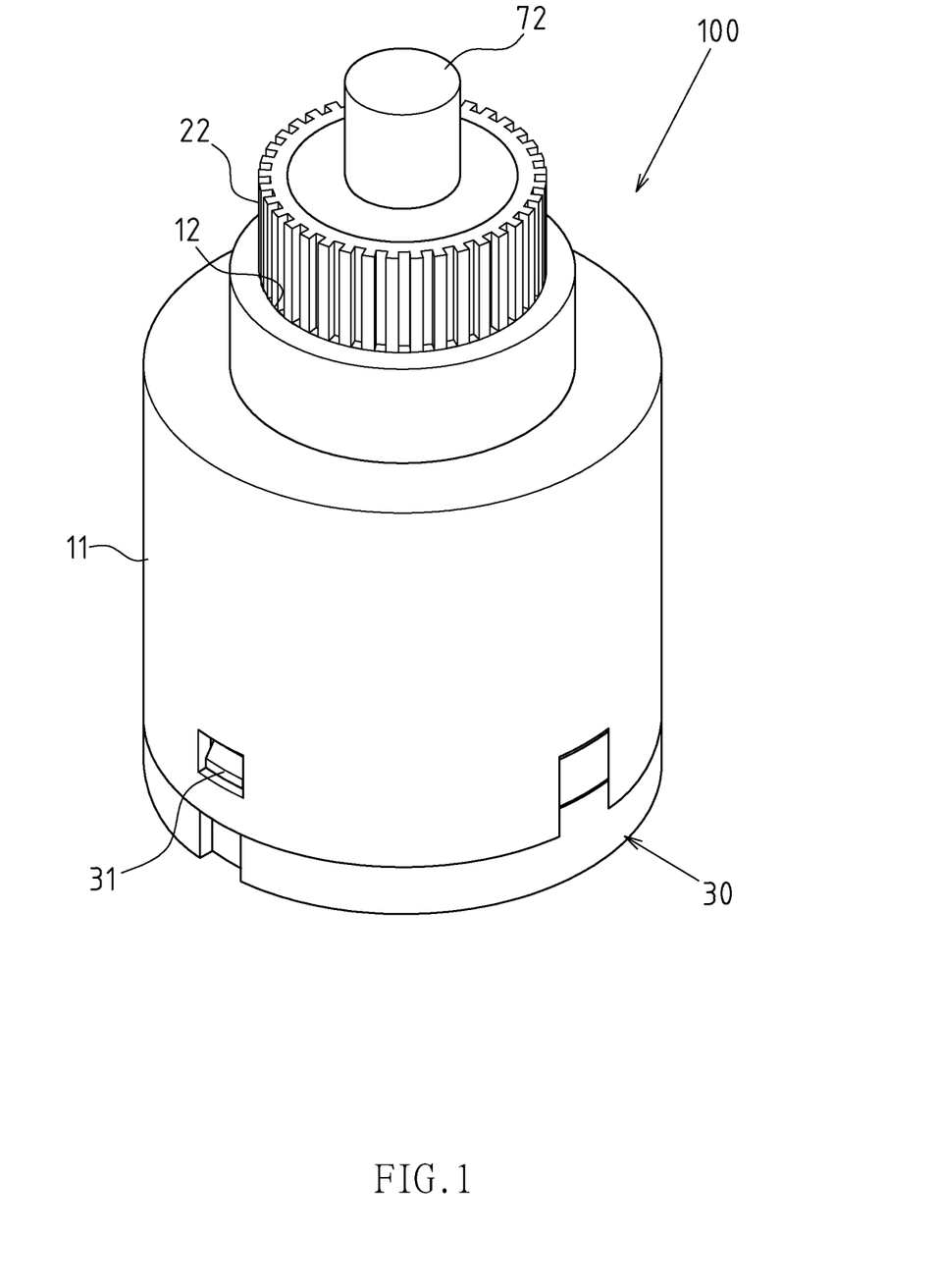
FIG. 1 is a combined perspective view of a preferred embodiment of a pressing-controlled mixing valve core of the present invention.

Referring to FIG. 1 and FIG. 5, in the present embodiment, the upper end of the reduced passive tube portion 22 of the rotational inner shell 20 is above the reduced pipe mouth 12 of the shell body 10a for a certain height (as indicated by H in FIG. 5). The structural form disclosed in the present embodiment makes it easy for the reduced passive tube portion 22 to be further coupled with a control component (such as a knob, a handle etc, not shown in the drawing), so as to facilitate operation by users.

Figure 7:
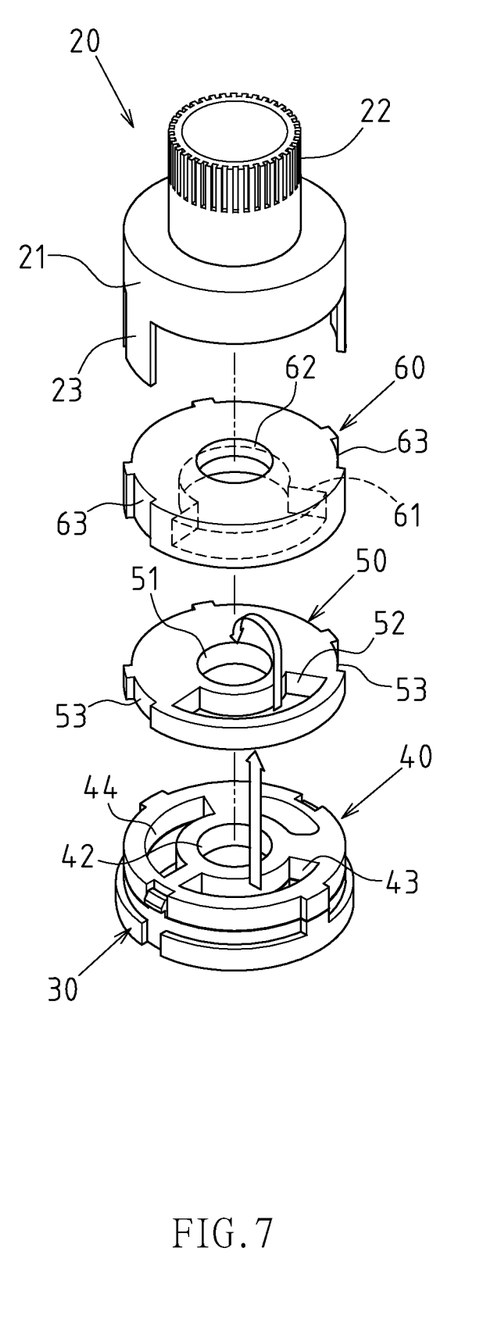
FIG. 7 is schematic view to show the corresponding relations between the components in Mixing Adjustment State 1.
Figure 8:
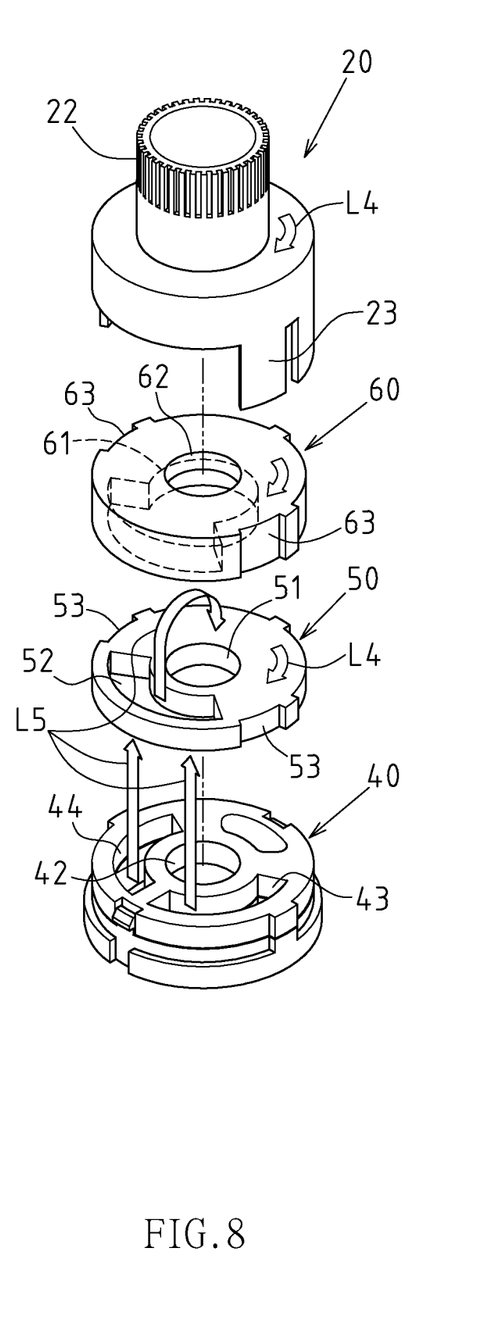
FIG. 8 is schematic view to show the corresponding relations between the components in Mixing Adjustment State 2.

Based on the structural composition and technical features described above, the pressing-controlled mixing valve core 100 disclosed in the present invention can accomplish two practical functions: adjustment of the mixture of two water sources and fast pressing-controlled flow rate shifting. The term "two water sources" can refer to two water inlets of different temperatures (hot water and cold water) or two water inlets of different qualities (such as pure water and alkaline water). Firstly, let's discuss how the function of fast pressing-controlled flow rate shifting is realized. Referring to FIG. 5, which shows a rising position of the water control rod head 743 of the lifting shaft 74 of the pressing-controlled lifting actuator 70, in this state, because the water control rod head 743 is above the through flow passage 61 for a certain height, it has minimal influence on the water flow sectional area of the through flow passage 61, therefore, the water flow going from the mixed water adjustment hole 52 of the moving ceramic chip 50 upward, through the through flow passage 61 of the flow adjustment top seat 60, downward to the mixed water extraction hole 51 of the moving ceramic chip 50 (indicated by Arrow L1 in FIG. 5) will be smooth with a high flow rate, realizing the preset mode of high flow rate; then, referring to FIG. 6, when the user presses down the pressing piece 72 (indicated by Arrow L2), the water control rod head 743 configured on the lifting shaft 74 is shifted to a descending position, the water control rod head 743 is lowered into the mixed water extraction hole 51 of the moving ceramic chip 50 for a certain depth, so that there is only a ring-shaped passage between the water control rod head 743 and the mixed water extraction hole 51, realizing the preset mode of low flow rate (indicated by Arrow L3). Now, let's further discuss how the mixture of two water sources is adjusted. Referring to FIG. 7, as the flow adjustment top seat 60, the moving ceramic chip 50 and the rotational inner shell 20 rotates simultaneously, when the rotational inner shell 20 rotates, it will simultaneously drive the mixed water adjustment hole 52 of the moving ceramic chip 50 to have a rotational displacement, and to have different communicating states between the first guide hole 43 and second guide hole 44 of the fixed ceramic chip 40. As an example, FIG. 7 shows the state that the mixed water adjustment hole 52 of the moving ceramic chip 50 is only aligned and communicated to the first guide hole 43 of the fixed ceramic chip 40. When the moving ceramic chip 50 is driven by the rotational inner shell 20 to have a rotational displacement (indicated by Arrow L4), the mixed water adjustment hole 52 of the moving ceramic chip 50 will be communicated to both the first guide hole 43 and second guide hole 44 of the fixed ceramic chip 40, realizing the function of adjusting the mixture of two water sources and output the mixture (indicated by Arrow L5). The proportion of the mixture will change according to the rotation angle of the moving ceramic chip 50.

To summarize, the structure of the pressing-controlled mixing valve core 100 disclosed in the present invention is quite simple. The water flow holes configured on its moving ceramic chip 50 and fixed ceramic chip 40 can be maintained as the original simplest vertical through holes, meeting the optimal manufacturing and processing requirements for products of ceramic material. As the flow adjustment top seat 60 is an independently manufactured component, its thickness can be increased so that the through flow passage 61 configured on it can have sufficient flow passage sectional area to guarantee optimum flow state of the mixed water and meet the needs of users. Moreover, the present invention can realize fast flow rate shifting through pressing control, and can realize adjustment of the mixture of two different water sources through turning control. It is very convenient for users to operate.

I claim:

1. A pressing-controlled mixing valve core with through flow control type on the top, said pressing-controlled mixing valve core comprising:
   a shell body, having a cylindrical peripheral wall, formed on a reduced pipe mouth on the top end of the cylindrical peripheral wall, and a lower opening formed on the bottom end of the cylindrical peripheral wall, the inside of the shell body defining a chamber;
   a rotational inner shell, housed inside the chamber of the shell body, capable of rotation under force, said rotational inner shell including a rotational seat configured at a higher position on the top section of the chamber, a reduced passive tube portion connected above the rotational seat, and a plurality of driving claws, protruding out of the lower end of the rotational seat and arranged at intervals, wherein the top end of said reduced passive tube portion goes upward through the reduced pipe mouth of the shell body, the lower end of said reduced passive tube portion is formed with a bottom wall, and said bottom wall is formed with an axial through hole;
   a water guide base, locked and positioned on the lower opening of the shell body through a plurality of lockers, configured with a mixed water outlet, a first water source inlet, and a second water source inlet, respectively at the central position and eccentric positions, spaced between each other;
   a fixed ceramic chip, stacked and positioned above the water guide base, and placed inside the chamber of the shell body, configured with a mixed water guide hole, a first guide hole and a second guide hole, respectively at the central position and eccentric positions, spaced between each other, respectively aligned to and normally communicated to the mixed water outlet, first water source inlet, and second water source inlet configured on the water guide base;
   a moving ceramic chip, stacked above the fixed ceramic chip and placed inside the chamber of the shell body, capable of rotation, configured with a mixed water extraction hole, and a mixed water adjustment hole, positioned respectively at the central position and eccentric position, spaced between each other, wherein, said mixed water extraction hole is normally communicated to the mixed water guide hole of the fixed ceramic chip, while the mixed water adjustment hole goes along the rotation of the moving ceramic chip to have different communication state to the first guide hole and to the second guide hole of the fixed ceramic chip, so as to adjust the mixture of the inlet water flow; the lateral side of said moving ceramic chip is formed with a plurality of passive concave margins spaced between each other, to be inserted by the plurality of driving claws of the rotational inner shell, so that the moving ceramic chip will rotate simultaneously with the rotational inner shell;
   a flow adjustment top seat, stacked above the moving ceramic chip and placed inside the chamber of the shell body, said flow adjustment top seat rotating simultaneously with the moving ceramic chip, the bottom of said flow adjustment top seat formed with a through flow passage recessing upward, said through flow passage communicated both to the mixed water extraction hole and to the mixed water adjustment hole configured on the moving ceramic chip; said through flow passage is formed with a vertical through hole at the position corresponding to the center of the flow adjustment top seat, the top end of said vertical through hole aligned to the axial through hole formed on the bottom wall of the reduced passive tube portion of the rotational inner shell; and
   a pressing-controlled lifting actuator, mainly housed inside the reduced passive tube portion of the rotational inner shell, said pressing-controlled lifting actuator comprising a shell, a pressing piece, a lifting actuator, a lifting shaft, and an elastic recovering component, wherein, said pressing piece is configured on the top end of the shell, capable of moving under pressure, said lifting shaft includes a passive shaft and a water control rod head connected to the lower end of the passive shaft, the upper end of said passive shaft is extended into the shell, while said water control rod head protrudes downward out of the lower end of the shell, said lifting actuator is housed inside the shell and fitted between the pressing piece and the lifting shaft, said lifting actuator is used to transform the pressing action of the pressing piece into a lifting action of the lifting shaft, said elastic recovering component is configured inside the shell to enable automatic recovery of the lifting shaft; furthermore, the lower end of said passive shaft goes through the axial through hole formed on the bottom wall of the reduced passive tube portion of the rotational inner shell, so that the water control rod head is positioned inside the vertical through hole and the through flow passage formed on the flow adjustment top seat, and the water control rod head has a rising position and a descending position along the up-and-down movement of the lifting shaft to change the sectional area of water flow from the through flow passage and adjust the outlet water flow of the pressing-controlled mixing valve core.

2. The pressing-controlled mixing valve core with through flow control type on the top defined in claim 1, wherein, the bottom wall of the reduced passive tube portion of the rotational inner shell further protrudes downward to form a convex wall portion; said convex wall portion is aligned to and inserted into the vertical through hole of the flow adjustment top seat for a certain depth.

3. The pressing-controlled mixing valve core with through flow control type on the top defined in claim 1, wherein, when the water control rod head is at a descending position, it is lowered into the mixed water extraction hole of the moving ceramic chip for a certain depth, so that there remains only a ring-shaped flow passage between the water control rod head and the mixed water extraction hole, realizing the state of relatively low flow rate.

4. The pressing-controlled mixing valve core with through flow control type on the top defined in claim 1, wherein the bottom wall of the reduced passive tube portion of the rotational inner shell is further configured with a sealing ring, said sealing ring being sealed against the passive shaft of the lifting shaft.

5. The pressing-controlled mixing valve core with through flow control type on the top defined in claim 1, wherein, the lateral side of the flow adjustment top seat is formed with a plurality of passive grooves with a space between each other, to be inserted by the plurality of driving claws of the rotational inner shell, so that the flow adjustment top seat, the moving ceramic chip and the rotational inner shell rotate simultaneously.

6. The pressing-controlled mixing valve core with through flow control type on the top defined in claim 1, wherein, the upper end of the reduced passive tube portion of the rotational inner shell is above the reduced pipe mouth of the shell body for a certain height.

* * * * *